March 12, 1940.  J. MacBLANE  2,193,289
TWO-SPEED TRANSMISSION FOR BICYCLES
Filed June 11, 1938   2 Sheets-Sheet 1
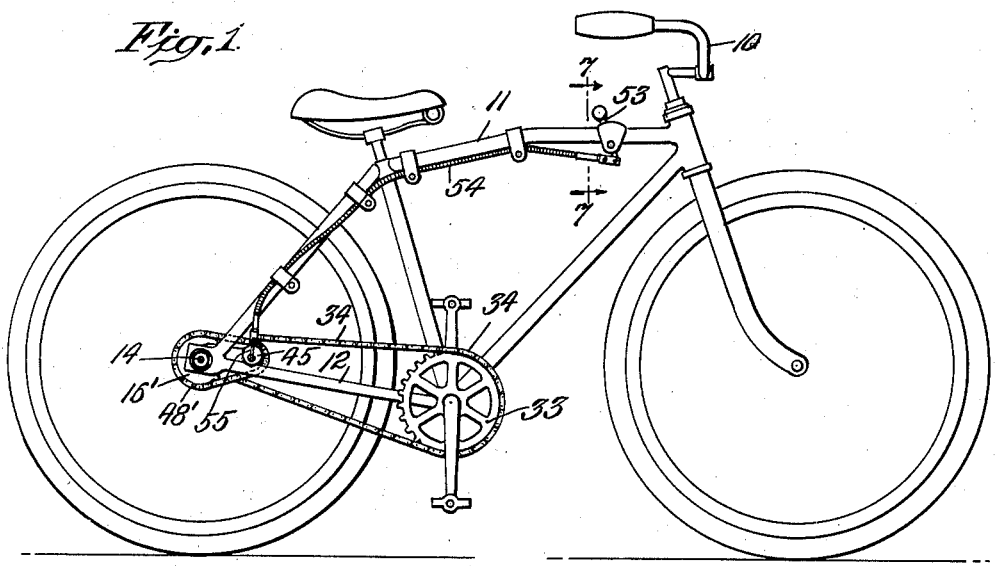
Fig. 1.
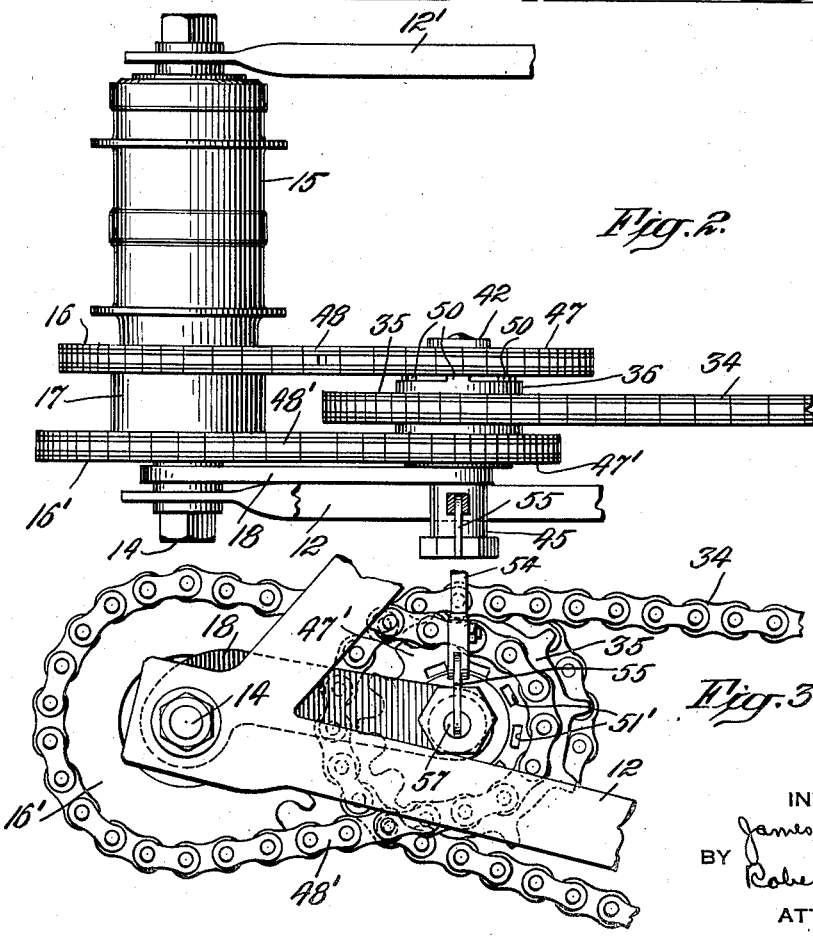
Fig. 2.
Fig. 3.
INVENTOR
James MacBlane
BY Robert W. Byerly
ATTORNEY March 12, 1940.  J. MacBLANE  2,193,289
TWO-SPEED TRANSMISSION FOR BICYCLES
Filed June 11, 1938  2 Sheets-Sheet 2
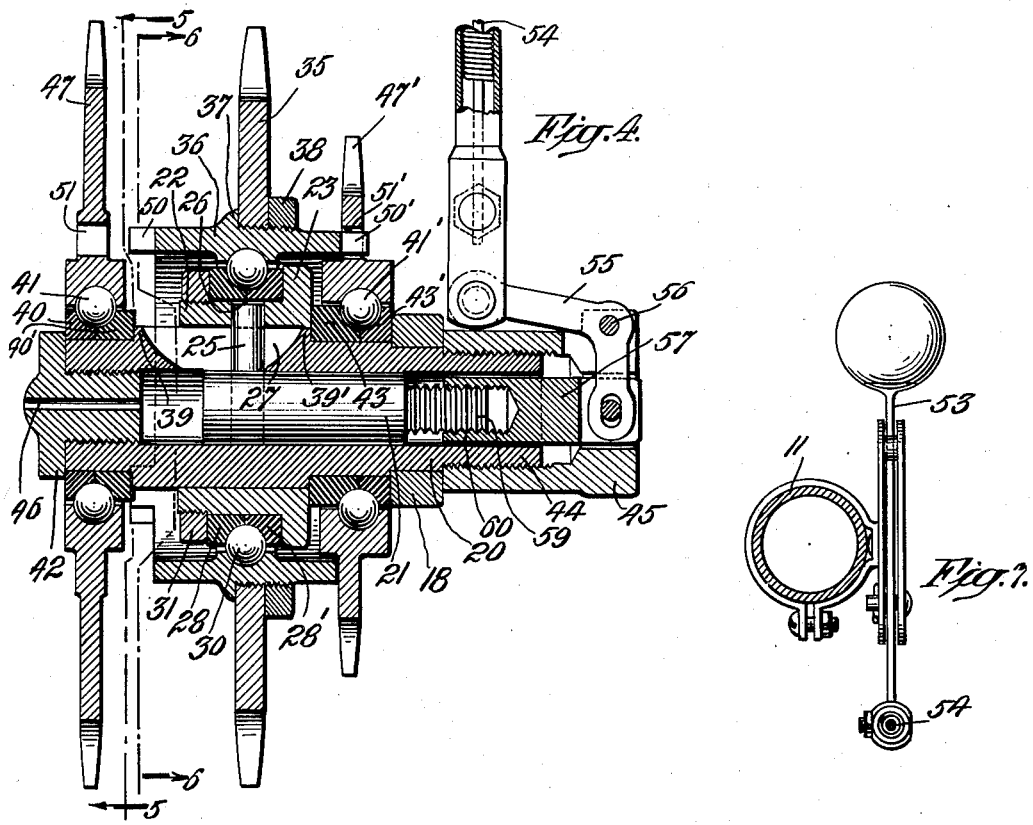
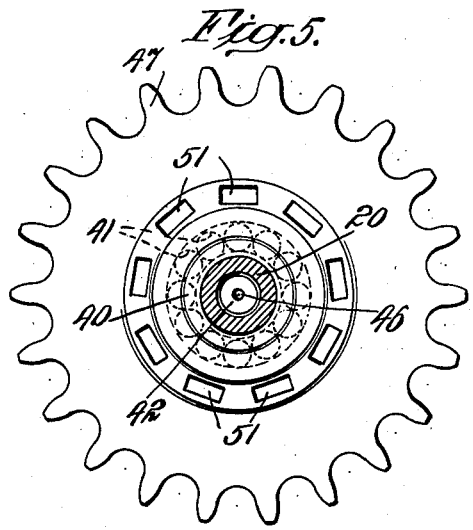
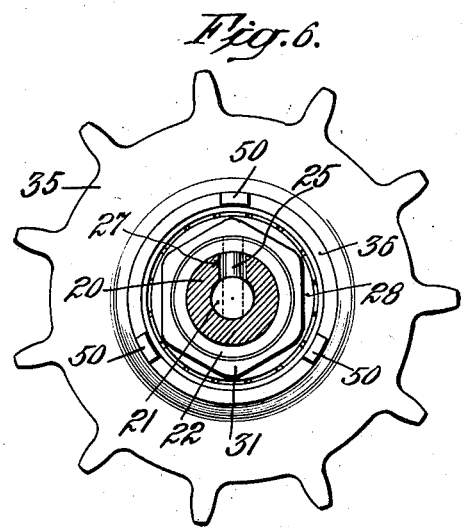
INVENTOR
James MacBlane
BY Robert W. Byerly
ATTORNEY Patented Mar. 12, 1940

2,193,289

UNITED STATES PATENT OFFICE 2,193,289

TWO-SPEED TRANSMISSION FOR BICYCLES

James MacBlane, Elmira Heights, N. Y., assignor of one-half to Henry E. Van Ness, Elmira, N. Y.

Application June 11, 1938, Serial No. 213,138

7 Claims. (Cl. 74—217)

This invention relates to bicycles and aims to provide an improved two-speed transmission for bicycles.

A particular object of my invention is the provision of a two-speed transmission in which a positive drive between the pedal sprocket and the rear axle sprocket of the bicycle is maintained at all times.

A further object of my invention is to provide a compact two-speed transmission which may be easily attached to bicycles of the type now in common use, so that it will be out of the way of the rider.

A further object of my invention is the provision of a two-speed transmission for bicycles in which friction between the rotating and stationary parts is reduced to a minimum.

Other objects and advantages of my invention will be apparent from the accompanying drawings and the following description of an illustrative embodiment of my invention.

In accordance with my invention, a two-speed transmission for a bicycle comprises high- and low-speed driving connections between the crankshaft and the hub of the rear wheel, and includes means whereby either one of those connections may be broken only when the other is unbroken so that the crankshaft is never disconnected from the rear wheel hub.

A specific embodiment of apparatus for carrying out my invention is illustrated in the accompanying drawings in which:

Fig. 1 is a side elevation of a bicycle equipped with my two-speed transmission;

Fig. 2 is a plan view of the two-speed transmission;

Fig. 3 is a side elevation of the two-speed transmission;

Fig. 4 is a transverse section illustrating the clutch mechanism;

Fig. 5 is a section along the lines 5—5 of Fig. 4;

Fig. 6 is a section along the lines 6—6 of Fig. 4; and

Fig. 7 is a section along the lines 7—7 of Fig. 1.

The bicycle illustrated in Fig. 1 of the drawings is of the type now in general use and includes handle bars 10, upper frame member 11 and rear frame members 12, 12' which are supported by the rear axle 14. The bicycle may be provided also with a conventional coaster brake (not shown) housed in the rear hub 15. The two-speed transmission to be described is fixed to the rear axle 14 between the rear frame members 12 and 12'.

Two sprockets 16, 16' are fixed to a hub 17 journalled on the rear axle 14, and an arm 18 is fixed to the rear axle between the rear frame members 12, 12'. This arm 18 supports the hollow stub shaft 20. A plunger 21 is mounted in the stub shaft 20, and a collar 22 having a flange 23 is mounted on the sleeve 20 so that pin 25 extends through hole 26 in the collar and longitudinal slot 27 in stub shaft 20 to the plunger 21. A pair of washers 28, 28' having grooved edges cooperating to form the inner portion of a race for the ball bearing 30 are seated on the collar 22 between flange 23 and lock nut 31.

The pedal sprocket 33 is connected, through sprocket chain 34, with clutch sprocket 35, mounted for rotation about collar 22 on ball bearing 30 which prevents lateral movement of the clutch sprocket with respect to collar 22. As illustrated in Fig. 4, the clutch sprocket is provided with a separate hub 36 having an inner groove which provides the outer portion of the race for ball bearing 30. This clutch sprocket 35 is screwed on its hub 36 against shoulder 37 and is held in place by lock nut 38. Thus, larger or smaller sprockets may be used without requiring a separate hub for each.

The diameter of shaft 20 is reduced adjacent the ends of longitudinal slot 27 to provide shoulders 39, 39'. A pair of washers 40, 40' having grooved edges cooperating to form the inner portion of a race for ball bearing 41 are seated on the stub shaft 20 between bolt 42 and shoulder 39, and a pair of washers 43, 43' having grooved edges cooperating to form the inner portion of a race for ball bearing 41' are seated between the shoulder 39' and the inner end of arm 18, through which the outer end 44 of stub shaft 20 extends. The inner end of arm 18 is seated firmly against the washer 43' by means of a cap 45 which is screwed on the end 44 of the stub shaft and which rests upon rear frame member 12. Bolt 42 is provided with passageway 46 for the admission of lubricant to the plunger 21 and the interior of stub shaft 20.

A high-speed sprocket 47 having an annular groove in the inner portion of its hub which provides the outer portion of the race for ball bearing 41 is mounted for rotation about stub shaft 20 on that bearing which prevents lateral movement of the high-speed sprocket. A low-speed sprocket 47' having an annular groove in the inner portion of its hub which provides the outer portion of the race for ball bearing 41' is mounted for rotation about stub shaft 20 on that bearing which prevents lateral movement of the low-speed sprocket. The high-speed sprocket 47 and the low-speed sprocket 47' are connected with the rear axle sprockets 16 and 16' respectively through sprocket chains 48 and 48'.

The hub 36 of the clutch sprocket 35 is provided with a series of fingers 50 which extend toward, and are adapted to enter, slots 51 in the high-speed sprocket 47, and with fingers 50' which extend toward, and are adapted to enter, slots 51' in low-speed sprocket 47'. Means are provided for sliding clutch sprocket 35 along stub shaft 20 to cause fingers 50 to enter slots 51 and to cause fingers 50' to be withdrawn from slots 51' and vice versa.

A clutch-shifting lever 53, attached to the upper frame 11 adjacent handle bars 10 where it is convenient to the rider, is connected by means of a flexible cable 54 with an elbow lever 55 pivoted on the cap 45 at 56. The plunger 21 is connected with the inner end of elbow lever 55 by means of a coupling 57. The end 59 of plunger 21 is externally threaded so that it may be screwed into the internally threaded end 60 of coupling 57. The positions of plunger 21 and coupling 57 with respect to each other, when finally assembled, are thus determined by the positions in which they are placed when the assembly of these parts is begun and may be adjusted as desired.

When the clutch-shifting lever 53 is pushed forward, the flexible cable 54 causes the upper end of elbow lever 55 to be pushed down, thus pulling plunger 21 outwardly to the position illustrated in Fig. 4 where clutch sprocket 35 engages the low-speed sprocket 47' through the fingers 50' and is disengaged from the high-speed sprocket 47. When the clutch-shifting lever 53 is pulled back to the position illustrated in Fig. 1, the end of elbow lever 55 is raised, thus pivoting the elbow lever to cause plunger 21 to be pushed inwardly and sliding clutch sprocket 35 to a position where it engages high-speed sprocket 47 through the fingers 50 and is disengaged from low-speed sprocket 47'.

It is to be particularly noted that the spacing of high-speed sprocket 47 and low-speed sprocket 47' with respect to clutch sprocket 35 is such that the end of fingers 50 or 50' begin to enter the corresponding slots 51 or 51' before the other set of fingers is completely withdrawn from its slots. This not only affords a compact construction, but contributes a very important safety factor. Since there is no point at which the clutch sprocket 35 is disengaged from both the high-speed sprocket 47 and the low-speed sprocket 47', there is always a direct connection between the pedal sprocket and the rear axle sprocket, so that it is always possible to apply the brake or to pedal forward and the clutch is never in a neutral position where the bicycle would be out of control.

Entry of fingers 50 or 50' into their corresponding slots 51 or 51' is assured by virtue of the fact that the rear axle sprockets 16, 16' are fixed to a common hub 17, and the high-speed sprocket 47 and the low-speed sprocket 47' rotate at different speeds. If the slots 51 or 51' should not be opposite their corresponding fingers 50 or 50' when the clutch-shifting lever 53 is pushed forward or back, the tension of flexible cable 54 will urge plunger 21 outwardly or inwardly until the difference in the speeds of rotation of high-speed sprocket 47 and low-speed sprocket 47' brings the slots 51 or 51' opposite the fingers 50 or 50' which are to enter them.

What is claimed is:

1. A two-speed transmission for a bicycle, comprising high- and low-speed driving connections between the crankshaft and the hub of the rear wheel, and means for breaking either one of said connections only when the other is made, so that the crankshaft is never disconnected from the rear wheel hub.

2. A two-speed transmission for a bicycle, comprising the combination with a coaster brake on the rear hub of the bicycle, of two driving connections between the hub of the coaster brake and the crankshaft, and means operable to break one of said connections only when the other is made, so that the crankshaft is never disconnected from the coaster brake.

3. A two-speed transmission for bicycles, comprising a shaft, a high-speed sprocket, a low-speed sprocket and a driving sprocket journalled thereon, engaging means on said high-speed and low-speed sprockets which are brought into alignment by the relative rotation of said sprockets, and a slidable member secured to the driving sprocket and adapted to slide from the engaging means of the high-speed sprocket to the engaging means of the low-speed sprocket only when said engaging means are in alignment.

4. In a transmission for bicycles, a stub shaft, two sprockets independently mounted thereon and so connected to a common rotary member that they rotate at different speeds, said sprockets containing recesses which are brought into alignment during their differential rotation, a third sprocket mounted between said two sprockets, a clutch element permanently connected with the middle sprocket and movable between the recesses of the other sprockets only when said recesses are in alignment.

5. In a transmission for bicycles, a shaft, two sprockets independently mounted on said shaft and rotated at different speeds and each containing a recess, a third sprocket slidably and rotatably mounted on said shaft between the other two sprockets, a slidable clutch element carried by the middle sprocket engaging the recess of one sprocket and being of such length that it is movable out of engagement with said recess only when the recess of the other sprocket is aligned with said recess.

6. In a two-speed transmission for bicycles, a shaft, two sprockets individually mounted on said shaft and rotated at different speeds, and each containing a recess, a clutch element carried by the middle sprocket engaging the recess of one sprocket and being of such length that it is movable out of engagement with said recess only when the recess of the other sprocket is aligned with said recess, and means for resiliently urging the middle sprocket in either direction.

7. A two-speed transmission for bicycles, comprising a hollow shaft, a high-speed sprocket, a low-speed sprocket, and a driving sprocket journalled thereon, engaging means on said high- and low-speed sprockets which are brought into alignment by the relative rotation of said sprockets, and a member, mounted for sliding movement within the shaft, attached to the driving sprocket and adapted to move the driving sprocket from the engaging means of the high-speed sprocket to the engaging means of the low-speed sprocket only when said engaging means are in alignment.

JAMES MacBLANE.